(12) United States Patent
Guignard et al.

(10) Patent No.: US 9,660,308 B2
(45) Date of Patent: May 23, 2017

(54) THERMAL PROTECTION CASE FOR A MOTOR VEHICLE BATTERY

(71) Applicant: RENAULT S.A.S., Boulogne-Billancourt (FR)

(72) Inventors: Fabrice Guignard, Guyancourt (FR); Francois Jaglin, Saint Remy les Chevreuse (FR); Sebastien Cadoret, Montrouge (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/439,805

(22) PCT Filed: Oct. 31, 2013

(86) PCT No.: PCT/EP2013/072760
§ 371 (c)(1),
(2) Date: Apr. 30, 2015

(87) PCT Pub. No.: WO2014/068025
PCT Pub. Date: May 8, 2014

(65) Prior Publication Data
US 2015/0280293 A1 Oct. 1, 2015

(30) Foreign Application Priority Data
Oct. 31, 2012 (FR) ..................... 12 60435

(51) Int. Cl.
*H01M 2/10* (2006.01)
*H01M 10/625* (2014.01)
(Continued)

(52) U.S. Cl.
CPC ....... *H01M 10/625* (2015.04); *H01M 2/1072* (2013.01); *H01M 2/1088* (2013.01);
(Continued)

(58) Field of Classification Search
CPC .. H01M 2/1072; H01M 2/1088; H01M 10/06; H01M 10/625; H01M 2220/20;
(Continued)

(56) References Cited

U.S. PATENT DOCUMENTS

| 4,006,280 A | 2/1977 | Walker et al. |
| 5,543,248 A | 8/1996 | Dougherty et al. |

(Continued)

FOREIGN PATENT DOCUMENTS

| DE | 19752755 A1 | 7/1999 |
| GB | 2087636 A | 5/1982 |

OTHER PUBLICATIONS

International Search Report issued Feb. 18, 2014 in PCT/EP2013/072760 filed Oct. 31, 2013.
(Continued)

*Primary Examiner* — Mark F Huff
*Assistant Examiner* — Monique Wills
(74) *Attorney, Agent, or Firm* — Oblon, McClelland, Maier & Neustadt, L.L.P.

(57) ABSTRACT

A thermal protection device made from a polymer material, including two separate elements, a cover and a thermal protection case. The thermal protection case includes at least two foldable portions of which the link between the two is articulated about a hinge, the case configured to switch, by folding and unfolding, from a storage position to an operating position configured, by fixing to the battery support base that maintains the shape of same, to cover a motor vehicle battery, which may be in different formats depending on characteristics of the vehicle.

12 Claims, 5 Drawing Sheets

(51) Int. Cl.
*H01M 10/613* (2014.01)
*H01M 10/658* (2014.01)
*H01M 10/6551* (2014.01)
*H01M 10/06* (2006.01)

(52) U.S. Cl.
CPC ....... *H01M 10/613* (2015.04); *H01M 10/658* (2015.04); *H01M 10/6551* (2015.04); *H01M 10/06* (2013.01); *H01M 2220/20* (2013.01); *Y02E 60/126* (2013.01); *Y10T 29/49108* (2015.01)

(58) Field of Classification Search
CPC .. H01M 10/6551; H01M 10/613; H01M 2/10; Y10T 29/49108
See application file for complete search history.

(56) References Cited

U.S. PATENT DOCUMENTS

| | | | |
|---|---|---|---|
| 5,681,668 A | 10/1997 | Reed et al. | |
| 2010/0253519 A1* | 10/2010 | Brackmann | G01S 19/35 340/572.1 |
| 2011/0052975 A1* | 3/2011 | Lee | H01M 2/0237 429/178 |

OTHER PUBLICATIONS

French Search Report issued Jul. 22, 2013 in French Application 1260435 filed Oct. 31, 2012.

* cited by examiner

THERMAL PROTECTION CASE FOR A MOTOR VEHICLE BATTERY

The present invention relates to the envelope and to the cover of a thermal protection housing for a battery. It may be applied, for example, to batteries designed for terrestrial vehicles.

A thermal protection housing, commonly known as a cold box, has the function of protecting the battery from the heating generated by the heat of the engine.

This thermal protection housing may be composed of three parts: a base on which the body of the battery rests, a cover designed to close the thermal protection housing and a lateral thermal protection envelope.

'Thermal protection envelope' is understood to mean the element comprising four walls attached together by edges referred to as junction edges. It is also denoted as a screen or a jacket. It constitutes the essential part of the body of the thermal protection housing.

The term 'wall' refers to each lateral face of the thermal protection housing disposed according to a perpendicular plane with respect to the plane of the cover and to the plane of the base.

Generally speaking, the thermal protection envelope is directly connected to the base. This is the case according to the patent EP 0 676 818, where the base and the thermal protection envelope are a single piece in the form of a complete holding container. In the patent FR 2 898 094, the base and the thermal protection envelope are adjusted on top of one another by the lateral walls of the base. However, the thermal protection envelope is rigid and can neither be folded nor stowed without taking up a large space.

The invention aims to overcome this logistics problem by providing a thermal protection device made of polymer material, composed of two separate elements, a cover and a thermal protection envelope, characterized in that the thermal protection envelope comprises at least two foldable parts whose attachment is articulated about a hinge, the envelope being able to go, by folding and unfolding, from a stowed position to a functional position, designed, by fixing onto the battery support base providing its shape, to cover an automobile vehicle battery, where the latter may be of different formats depending on the characteristics of the vehicle.

The cover and the envelope can be installed on the base carrying the battery, the latter participating in the geometric shape of the envelope. They can contain several types of battery formats.

'Foldable parts' is understood to mean elements of the thermal protection envelope consisting of the walls articulated about a hinge, said hinge allowing a pivot movement about an axis of rotation.

This hinge provides an axis of rotation for the thermal protection envelope, allowing the adjacent junction edges to fold together. The thermal envelope such as described in the invention must comprise at least one hinge and may comprise, two, three, four or more hinges, of which at least one hinge can be closed by a locking system.

The possibility of folding together the various parts of the envelope allows it to be stacked without disassembling the various parts of the envelope, with a large space saving.

One preferred embodiment for the thermal protection envelope is characterized in that the edges of each wall, when they are abutted together, can be blocked by interlocking by a locking system. The advantage of the locking system is to provide the stability of the thermal protection housing by a device that is sufficiently solid and mechanically robust.

When they are in the functional position on the vehicle, the walls must form a rigid assembly. For this purpose, the walls need to be fixed at the junction edges by a locking system, at the free ends of the edges of the walls.

According to a preferred embodiment, the envelope comprises four hinges, of which at least two hinges can be closed by a locking system.

According to a preferred embodiment, the locking system is a system using fasteners.

According to a first variant, the system using fasteners is a system of spikes designed to engage into a corresponding notch on the opposing adjacent wall.

According to a second variant, the system of fasteners comprises, on at least one vertical or horizontal spigot, a click-fit flap or tab situated on said spigot, said click-fit flap or tab finding its corresponding notch on the adjacent wall.

In a particularly preferred manner, said polymer material is expanded polypropylene with a density less than or equal to 80 g/L.

Indeed, as opposed to loaded polypropylene, the use of expanded polypropylene allows the mass of the thermal protection housing to be significantly reduced, also reducing the energy consumption of the vehicles so equipped, and allows the thermal insulation of the battery to be improved.

Certain parts of the envelope and of the cover are made of polymer material (in a particularly preferred manner, of expanded polypropylene), with a density less than or equal to 40 g/L, and preformed in such a manner as to allow the passage of objects between the inside and the outside of the cold box (terminal lugs, sensors or other objects) by simple deformation of the material, without the addition of sealing foam.

The fabrication of the parts of the thermal protection envelope is carried out in such a manner that the walls are molded.

However, said polymer material may also be an expanded polymer and/or thermoplastic material, for example another polyolefin.

This thermal envelope can constitute one component of a thermal protection housing characterized in that it furthermore comprises a base designed to support the battery element and a cover designed to cover the battery element. The invention also relates to such a housing.

The invention lastly relates to a method of fabrication of such a thermal protection device, characterized in that the shaping mold defines at least two foldable parts on a shrunken area designed to form the hinge.

The invention is described hereinafter in greater detail with the aid of figures only showing preferred embodiments of the invention.

FIGS. 1A and 1B show perspective views of a thermal protection housing in which the main elements can be seen, namely the base 11, the thermal protection envelope 12 and the cover 13.

Figure 1A:
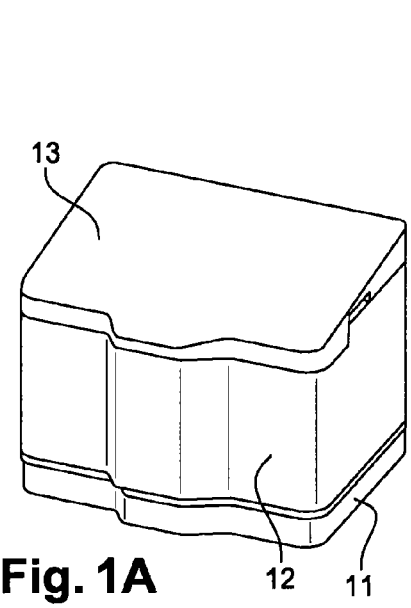
Figure 1B:
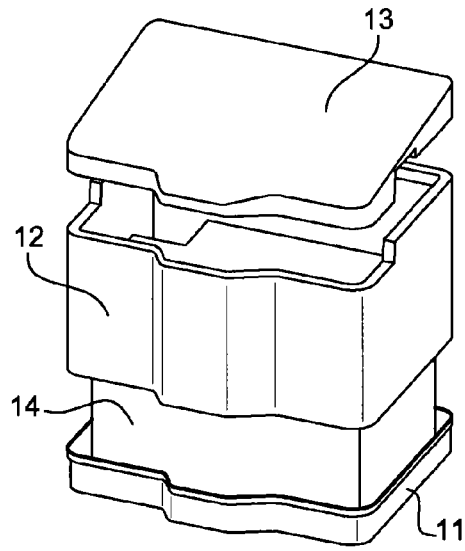

FIGS. 1A and 1B show a thermal protection housing on which the main elements can be seen, namely the base 11, the thermal protection envelope 12 and the cover 13.

In FIG. 1A, the thermal protection housing is shown in the closed and functional position.

In FIG. 1B, the main elements of said thermal protection housing are exploded. By separating the three main elements an automobile vehicle battery 14 is identified, resting on the base 11, over which are positioned the thermal protection envelope 12 and the cover 13.

The thermal protection housing comprises three separate parts:
the base 11, which is the base on which the battery rests,
the thermal protection envelope 12, which forms an insulating screen, in such a manner as to protect its contents from temperature extremes, notably excessively high temperatures, where said temperature extremes may be the consequence of the operation of an engine located nearby.
the cover 13, which allows the thermal protection housing to be closed, is generally composed of the same insulating material as the thermal protection envelope.

Figure 2A:
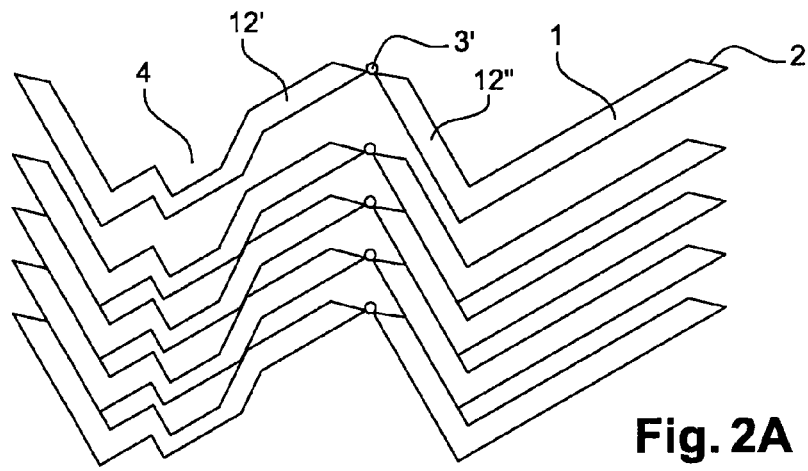
FIG. 2A shows a side view of the thermal protection envelopes with a single folding hinge stacked in the position for transport or for storing.

FIG. 2A shows a stacking of a first variant of the thermal protection envelope. In this FIG. 2A, the thermal protection envelope comprises a single hinge 3', the hinge being situated at one of the junction edges of the thermal protection envelope. Each thermal protection envelope is in the folded out position. Along one of its lengths, it has a section 4 protruding toward the outside of the envelope, forming a column and whose cross-section is a rectangular trapezium, serving as an additional space for accommodating the device for fixing the battery. Thus, once folded out in the same way, all the thermal protection envelopes can be stacked, interlocking onto one another, allowing a significant space gain.

Figure 2B:
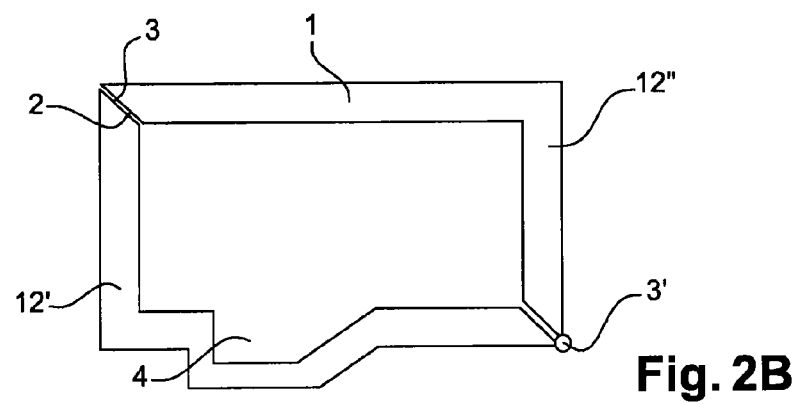
FIG. 2B shows a top view of a thermal protection envelope with a single folding hinge in the functional position, such as it is designed to be disposed in the vehicle and for accommodating the battery.

FIG. 2B shows the same thermal protection envelope, with a single hinge 3', in the functional position. The thermal protection envelope in the functional position has a structure in the shape of a rectangular parallelepiped, whose upper and lower faces are open. The thermal protection envelope is composed of four plane walls joined together. The plane walls 1 are beveled at their junctions 3 in such a manner that, in the functional position, the adjacent walls meet and are abutted together on their edges. The functional position is that for which the adjacent walls meet forming an angle of 90°.

For FIGS. 2A and 2B, the thermal protection envelope for an automobile vehicle battery made of polymer material comprises two foldable parts 12' and 12" whose attachment is articulated about a hinge, the envelope being able to go from a folded stowed position to a unfolded functional position designed to cover an automobile vehicle battery.

Figure 2C:
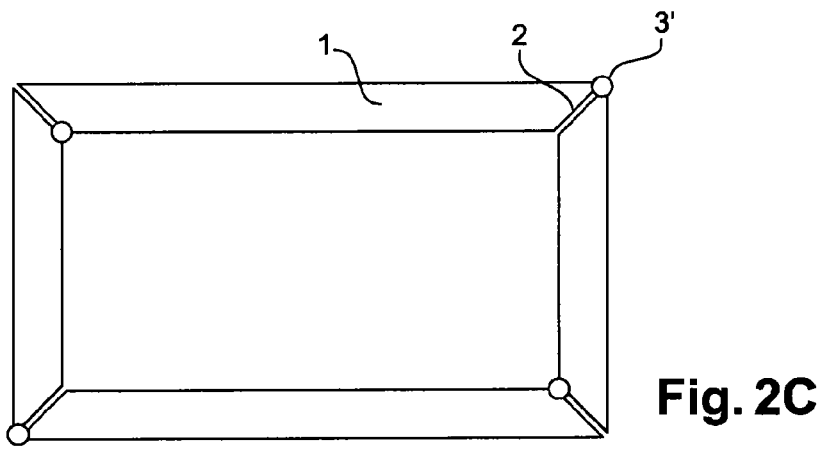
FIG. 2C shows a top view of a thermal protection envelope with four hinges, disposed in the functional position.

FIG. 2C shows a thermal protection envelope with four hinges, in the functional position. The thermal protection envelope in the functional position has a structure taking the form of a rectangular parallelepiped, whose upper and lower faces are open. The thermal protection envelope is composed of four plane walls connected together. The plane walls 1 form bevels 2 at their junctions 3 in such a manner that, in the vehicle position, the adjacent walls meet and are abutted together on their edges. The functional position is that for which the adjacent walls meet forming an angle of 90°.

Figure 2D:
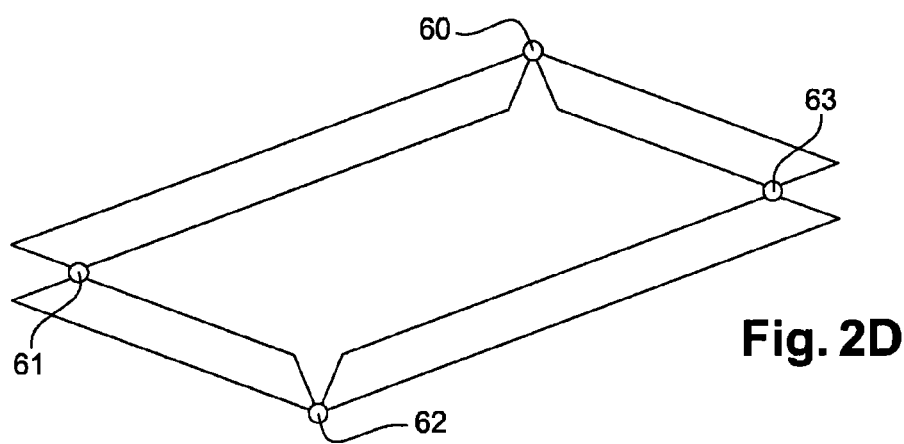
FIG. 2D shows a side view of a thermal protection envelope with four hinges, disposed in the position being folded or unfolded.

FIG. 2D shows the same thermal protection envelope, except that here it is unfolding towards the functional position.

Figure 2E:
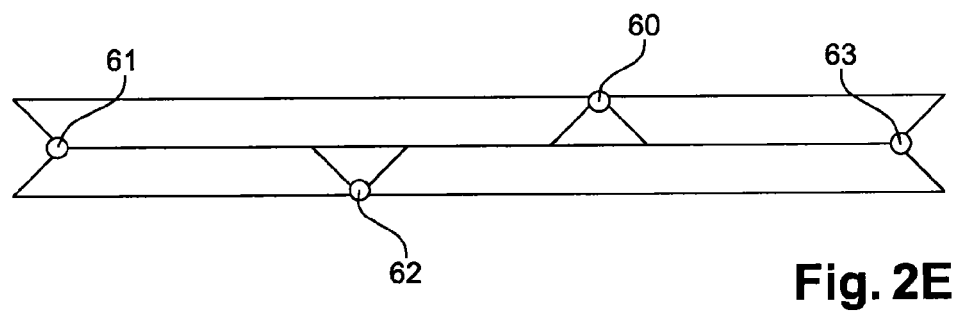
FIG. 2E shows a side view of a thermal protection envelope with four hinges, disposed flat in the position for transport. A thermal protection envelope with four hinges is considered.

FIG. 2E shows a thermal protection envelope folded up. It has four hinges, in an alternating fashion on the inside 61 and 63 and on the outside 60 and 62 of the thermal protection envelope. This alternation of the hinges allows the envelope to be completely folded up and thus a significant amount of space to be gained.

Figure 3A:
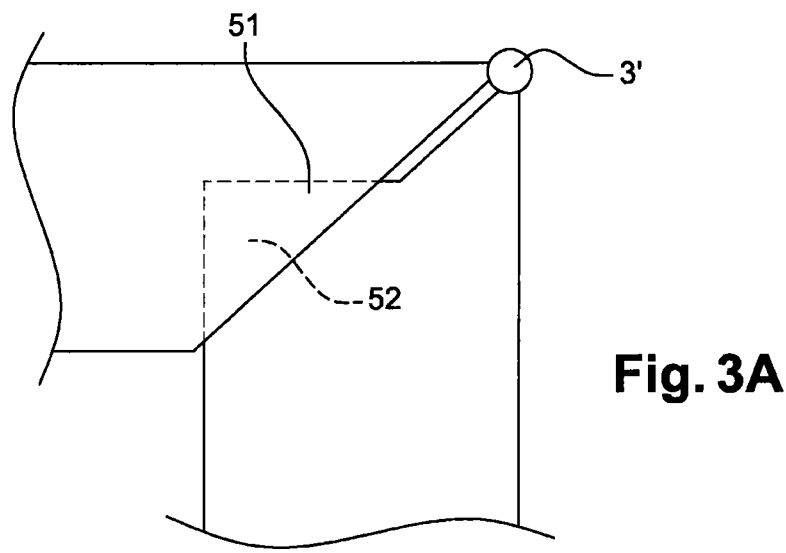
FIG. 3A shows a cross-sectional view of the locking systems at a hinge.

FIG. 3A shows an upper cross-sectional view of a junction edge of two adjacent walls, connected by a hinge system 3' and blocked by a locking system. The walls are joined together at the bevels of their respective end. In this system, there is a spigot 51 on the bevel 2, in the continuity of the internal edge of the wall. Half way along the bevel, it forms an angle of 90° with respect to the internal face of the wall. The spigot engages in the bevel of the opposing wall into a corresponding and symmetrical notch 52, which can be seen in FIG. 3B.

Figure 3B:
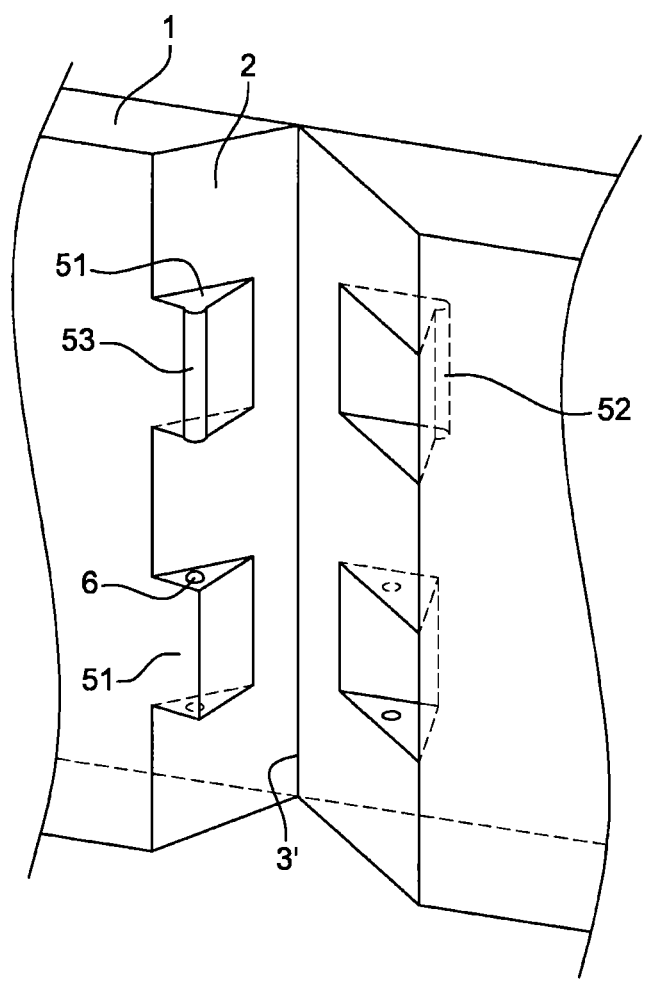
FIG. 3B shows a perspective view of various locking systems provided.

FIG. 3B shows a perspective view of a locking system using fasteners with spikes lower down and with an interlocking flap or tab higher up. In the first locking system mentioned, the system using fasteners is a system of spikes 6 designed to engage into a corresponding notch on the opposing adjacent wall. The second locking system using fasteners is a system by interlocking flap or tab and an interlocking flap or tab 53 is located on the bevel 2, in the continuity of the internal edge of the wall. The system of fasteners here comprises, on a vertical or horizontal spigot 51, a click-fit flap or tab 53 or 81 situated on the spigot finding its corresponding notch on the adjacent wall. Half way along the bevel, it forms an angle of 90° with respect to the internal face of the wall. The spigot finds a corresponding and symmetrical notch 52 in the bevel of the opposing wall.

Figure 3C:
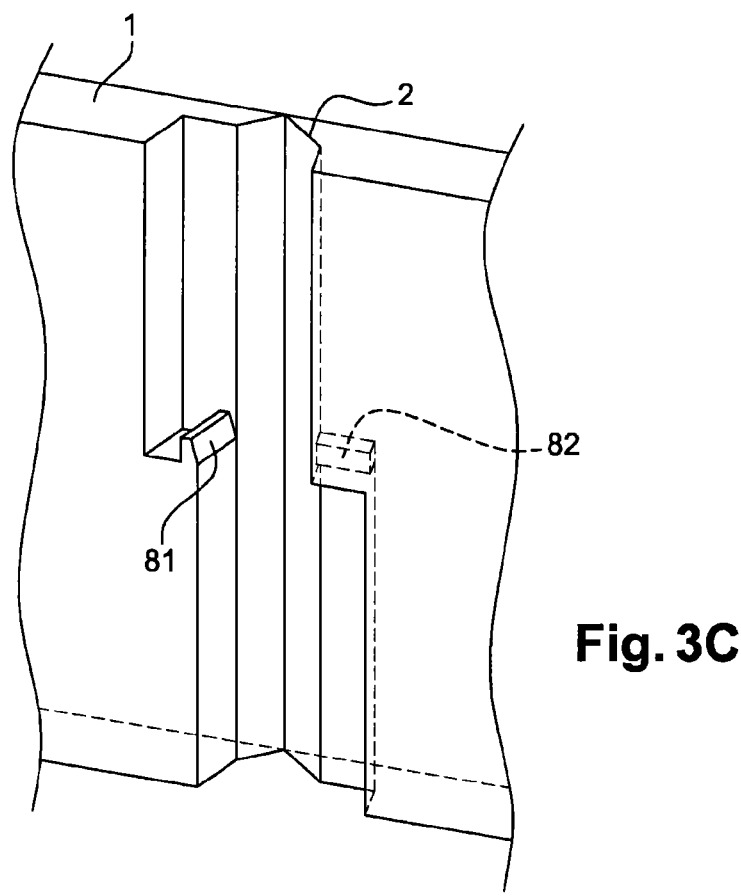
FIG. 3C shows a perspective view of another locking system by vertical interlocking flap or tab.

FIG. 3C shows a perspective view of a locking system of fasteners, including a parallelepiped-shaped slot or groove which can be formed in the wall 1, at the internal edge of the base of the bevel 2, longitudinally above which is located a click-fit flap or tab 81. This system finds its molding 82, in a symmetric manner, on the face adjacent to the bevel, in such a manner that, in the vehicle position, the two edges are able to interlock and remain so in the definitive position.

Figure 4A:
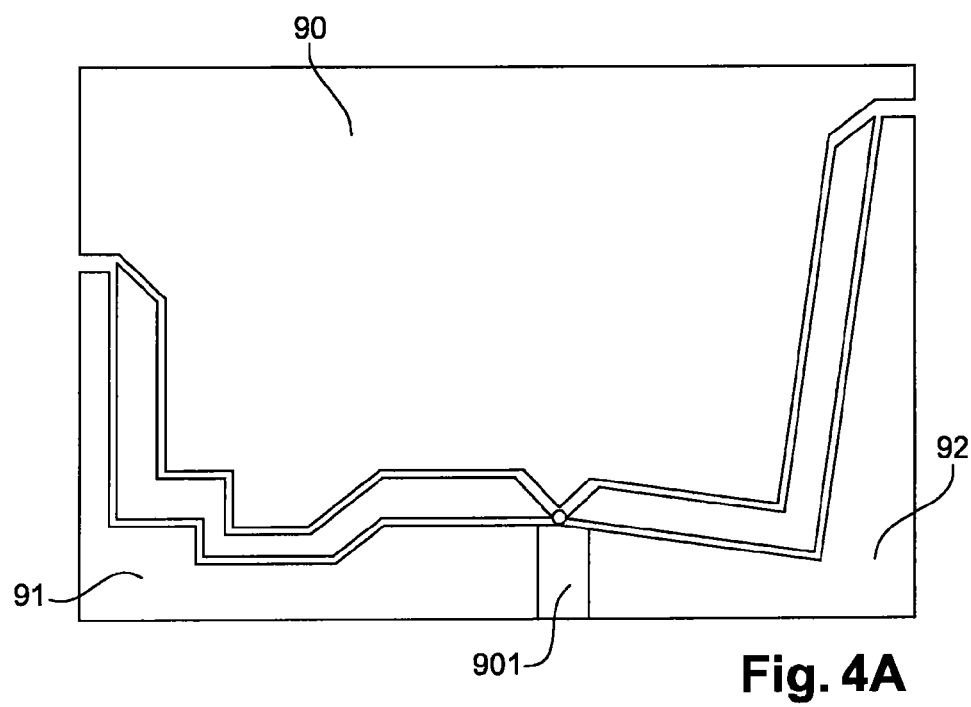
FIG. 4A shows one embodiment of the thermal protection envelope equipped with a single hinge. Three main parts are identified for molding and one specific part for compression of the hinges.

FIG. 4A shows a cross-sectional view of a mold designed for fabricating the thermal protection envelopes with a single hinge. The envelope composed of several parts assembled by a hinge allows a molding in a single shape in order to limit the size of the molding tooling. It requires a tooling composed of three molding members 90, 91, 92, and of one mobile element 901, used for the compression of said hinge. The method comprises the following steps:

formation of a shaping mold defining two parts being foldable in a shrunken area designed to form the hinge, injection of a polymer material into the mold, and reinforcement of the hinge with a compression point.

Figure 4B:
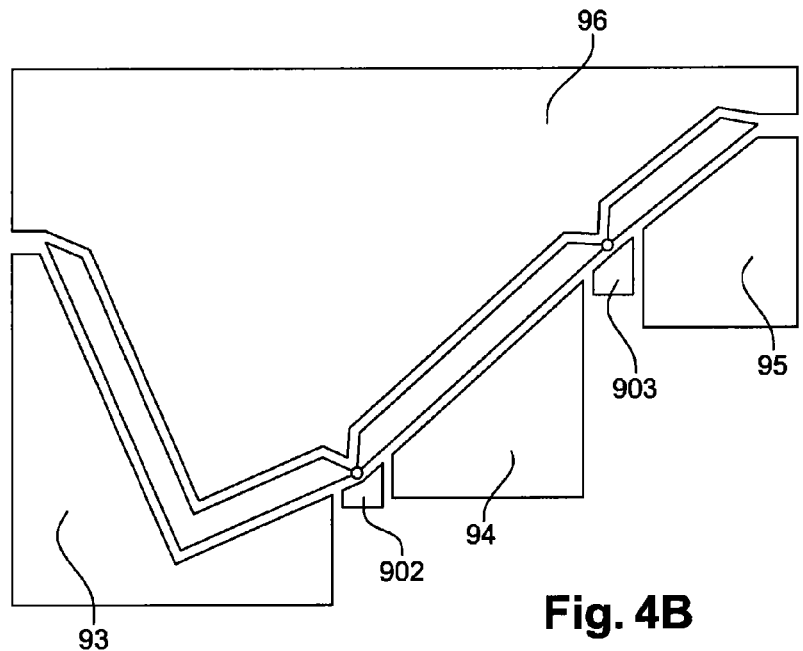
FIG. 4B shows a cross-sectional view of one embodiment of the thermal protection envelope, comprising four main parts for molding and two parts for compression of the hinges. The envelope here has two hinges.

FIG. 4B shows a cross-sectional view of a mold designed for fabricating thermal protection envelopes with two hinges. It requires a tooling consisting of four molding members 93, 94, 95, 96, and of two mobile elements 902, 903, used for the compression of the two hinges. The method comprises the following steps:

formation of a shaping mold defining three parts being foldable in a shrunken area designed to form the two hinges, injection of a polymer material into the mold, and reinforcement of the two hinges with a compression point.

Figure 4C:
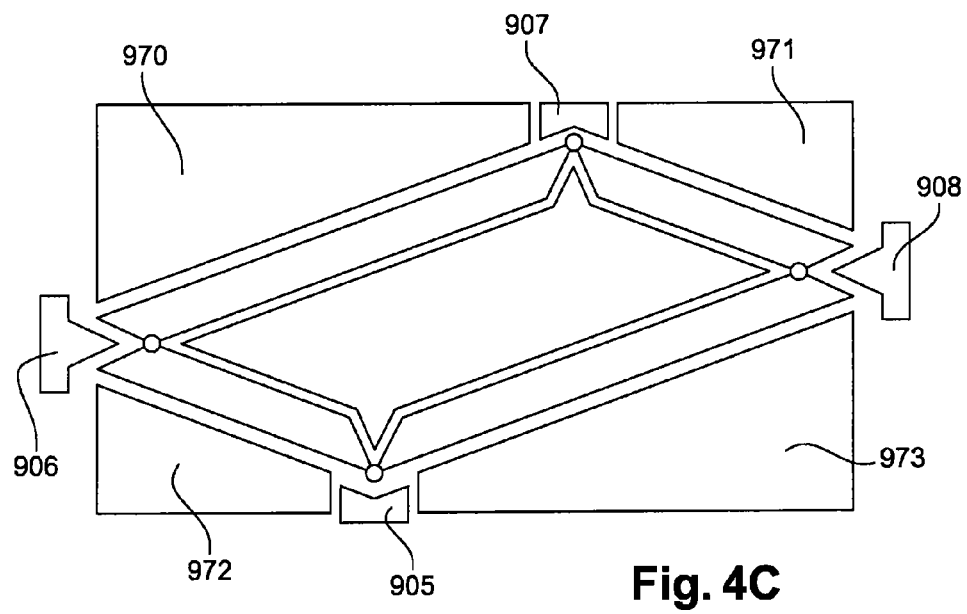
FIG. 4C shows a cross-sectional view of one embodiment of the thermal protection envelope with four hinges and with two locks. Four main parts can be seen for molding, and four parts for compression of the hinges.

FIG. 4C shows a cross-sectional view of a mold designed for fabricating thermal protection envelopes with four hinges. It requires a tooling consisting of four molding members 970, 971, 972, 973, and of two mobile elements 905, 907 used for the simple compression of the two hinges, and of two other mobile elements specially sculpted to form the mold for the locking system with fasteners 906, 908. The method comprises the following steps:

formation of a shaping mold defining four parts being foldable in a shrunken area designed to form the four hinges, injection of a polymer material into the mold, and reinforcement of the two simple hinges with a point of compression.

reinforcement of the two locking hinges with a point of compression, by means of members of the mold integrating the relief shapes allowing the aforementioned locking systems to be created.

The invention claimed is:

1. A thermal protection device, comprising:
two separate elements including a cover and a thermal protection envelope, the separate elements made of polymer material,
wherein the thermal protection envelope comprises at least two foldable parts whose attachment is articulated about a hinge, the envelope configured to go, by folding and unfolding, from a stowed position to a functional position, and configured, by fixing onto a battery support base providing its shape, to cover an automobile vehicle battery, and
wherein an axis of the hinge is configured to extend in a substantially perpendicular manner with respect to the cover.

2. The thermal protection device as claimed in claim 1, wherein edges of each wall of the envelope, when the walls are abutted together, are blocked from interlocking of a locking system.

3. The thermal protection device as claimed in claim 2, wherein the envelope comprises one to four hinges, of which at least one hinge is closed by a locking system.

4. The thermal protection device as claimed in claim 2, wherein the locking system is a system using fasteners.

5. The thermal protection device as claimed in claim 4, wherein the system using fasteners is a system of spikes configured to engage into a corresponding notch on an opposing adjacent wall.

6. The thermal protection device as claimed in claim 4, wherein the system of fasteners comprises, on at least one vertical or horizontal spigot, a click-fit flap or tab situated on the spigot and the click-fit flap or tab finding its corresponding notch on an adjacent wall.

7. The thermal protection device as claimed in claim 1, wherein the polymer material is expanded polypropylene with a density less than or equal to 80 g/L.

8. The thermal protection housing as claimed in claim 1, further comprising a base configured to support the battery and a cover configured to cover the battery.

9. A method of fabrication of the thermal protection device as claimed in claim 1, wherein a shaping mold defines the at least two foldable parts on a shrunken area designed to form the hinge.

10. The thermal protection device as claimed in claim 1, wherein the automobile vehicle battery may be of different formats depending on characteristics of the vehicle.

11. A thermal protection device, comprising:
two separate elements including a cover and a thermal protection envelope, the separate elements made of polymer material,
wherein the thermal protection envelope comprises at least two foldable parts whose attachment is articulated about a hinge, the envelope configured to go, by folding and unfolding, from a stowed position to a functional position, and configured, by fixing onto a battery support base providing its shape, to cover an automobile vehicle battery, and
wherein an axis of the hinge is configured to extend in a substantially perpendicular manner with respect to the battery support base.

12. A thermal protection device, comprising:
two separate elements including a cover and a thermal protection envelope, the separate elements made of polymer material,
wherein the thermal protection envelope comprises at least two foldable parts whose attachment is articulated about a hinge, the envelope configured to go, by folding and unfolding, from a stowed position to a functional position, and configured, by fixing onto a battery support base providing its shape, to cover an automobile vehicle battery, and
wherein an axis of the hinge is configured to extend between the cover and the battery support base.

* * * * *